E. WEISSENBORN.

*Original in Educational-Geography*

Improvement in the Manufacture of Hollow-Globes and other Articles from Pasteboard.

No. 4,981. Reissued July 16, 1872.

Witnesses:
C. Wahlers.
Ernst Bilhuber.

Applicant
Joseph Schedler,
assignee of
Edward Weissenborn
per Schoonl & Hart
Attys

UNITED STATES PATENT OFFICE.

EDWARD WEISSENBORN, OF HUDSON CITY, NEW JERSEY, ASSIGNOR TO JOSEPH SCHEDLER.

IMPROVEMENT IN THE MANUFACTURE OF HOLLOW GLOBES AND OTHER ARTICLES FROM PASTEBOARD.

Specification forming part of Letters Patent No. 84,398, dated November 24, 1868; reissue No. 4,981, dated July 16, 1872.

*To all whom it may concern:*

Be it known that EDWARD WEISSENBORN, of Hudson City, in the county of Hudson and State of New Jersey, did invent a new and useful Improvement in the Manufacture of Hollow Globes and other articles from Pasteboard; and the following is hereby declared to be a full, clear, and exact description thereof, which will enable those skilled in the art to make and use the same, reference being had to the accompanying drawing forming part of this specification, in which drawing—

Figure 1:
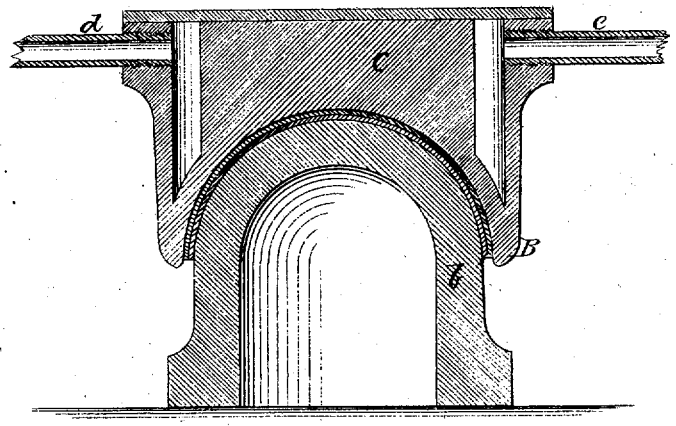
Figure 2:
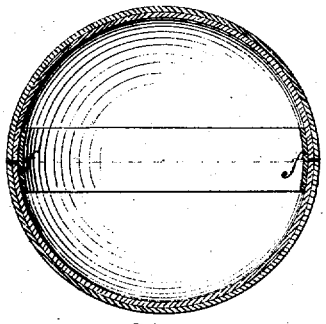
Figure 3:
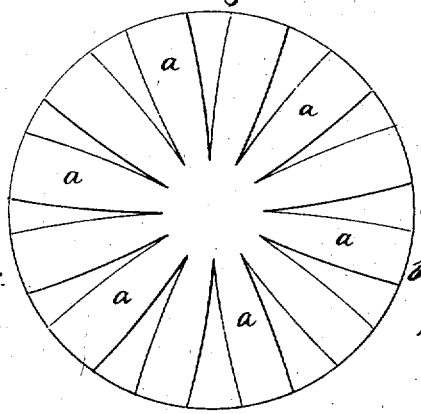

Figure 1 represents a vertical central section of the mold used for carrying out this invention. Fig. 2 is a central section of a globe constructed according to this invention. Fig. 3 is a plan of the blanks, which are used in manufacturing hemispheres according to this invention.

Similar letters indicate corresponding parts.

This invention consists in the peculiar manner of cutting out the blanks and of uniting the same, each hemisphere or other article of a similar nature being made of two or more layers of pasteboard, which are cut out to form a series of radiating arms with intermediate triangular spaces, and laid one on the top of the other so as to break joints, and that by applying glue or other cement between the two layers, and subjecting the same to a heavy pressure in a suitable mold, (which may be heated,) the several layers are firmly united, and the edges of the various radiating arms are brought together, and thereby a smooth, strong, and durable hemisphere, cup, or other article is produced, the shape of the mold being varied according to the articles to be produced. When two hemispheres are to be united to form a globe their edges are turned off true, and then they are connected by an internal strip of pasteboard, leaving the outer surface smooth and even.

In the drawing, the letter A, Fig. 3, designates one of the blanks or layers of pasteboard from which hemispheres or other hollow articles are manufactured according to this invention. These blanks are cut out so that the same form a series of radiating arms, *a*, and after the blanks have been properly prepared one of them is picked out and one of its surfaces is covered with a thin layer of glue or other cement; then another blank is placed on the first so as to break joints, or so that the arms *a* of the second blank will cover the open spaces between the arms of the first blank, and before the glue or other cement has set the two blanks are introduced into the mold B, Fig. 1. This mold consists of the male part *b* and the female part *c*, and either one or both parts are heated by steam or hot air, which may be introduced through a pipe, *d*, and exhausted through a pipe, *e*. After the two blanks or layers of pasteboard, prepared as above described, have been adjusted on the male part of the mold the female part is forced down by means of hydraulic or other powerful pressure, and the two layers of pasteboard are formed into a hemisphere or cup corresponding to the mold, the edges of the arms *a* of each layer being brought close together, and united to each other by the glue or other cement applied to one of the layers and by the adjacent arms of the other layer.

The hemispheres or cups thus produced can be used for various purposes, according to their shape; and it is obvious that articles of a great variety of form can be produced simply by changing the form of the mold, and by cutting out the blanks to suit.

If it is desired to unite two hemispheres so as to produce a hollow globe, the edges of said hemispheres are turned off true, and a strip, *f*, of pasteboard, is glued fast to the inner surface of one of the hemispheres, the edge of said strip being made to project a certain distance beyond the edge of the hemisphere to which it is secured; then the outer surface of that portion of the strip *f* which projects beyond the edge of the hemisphere is well covered with glue, and the second hemisphere is pressed down over it until the edges of the two hemispheres meet. By the strip *f* the two hemispheres are firmly united, and globes are formed which are durable, firm, not liable to get broken, and which can be produced at a very cheap rate. When these globes are to be used for school-globes their surfaces are ground off, so that the same become smooth and free from all ridges before the maps are applied.

What is claimed as new, and desired to be secured by Letters Patent, is—

1. A hemisphere or other article made of two or more layers, A, of pasteboard cut out to form arms *a*, and placed together and united by the aid of a mold, B, substantially as shown and described.

2. The strip *f*, pasted to the inner surface of one of the hemispheres, and serving to fasten and retain the second hemisphere, substantially as set forth.

JOS. SCHEDLER.

Witnesses:
W. HAUFF,
E. F. KASTENHUBER.